US010005554B2

(12) United States Patent
Chan

(10) Patent No.: US 10,005,554 B2
(45) Date of Patent: Jun. 26, 2018

(54) UNMANNED AERIAL VEHICLE

(71) Applicant: Singapore Technologies Aerospace Ltd, Paya Lebar (SG)

(72) Inventor: Keen Ian Chan, Singapore (SG)

(73) Assignee: Singapore Technologies Aerospace Ltd., Singapore (SG)

( * ) Notice: Subject to any disclaimer, the term of this patent is extended or adjusted under 35 U.S.C. 154(b) by 135 days.

(21) Appl. No.: 15/028,765

(22) PCT Filed: Dec. 24, 2013

(86) PCT No.: PCT/SG2013/000548
§ 371 (c)(1),
(2) Date: Apr. 12, 2016

(87) PCT Pub. No.: WO2015/099603
PCT Pub. Date: Jul. 2, 2015

(65) Prior Publication Data
US 2016/0272313 A1    Sep. 22, 2016

(51) Int. Cl.
*B64C 27/22* (2006.01)
*B64C 29/02* (2006.01)
(Continued)

(52) U.S. Cl.
CPC .............. *B64C 29/02* (2013.01); *A63H 27/12* (2013.01); *B64C 11/48* (2013.01); *B64C 27/08* (2013.01);
(Continued)

(58) Field of Classification Search
CPC ....... B64C 29/02; B64C 39/024; B64C 27/08; B64C 39/02; B64C 2201/088;
(Continued)

(56) References Cited

U.S. PATENT DOCUMENTS 5,289,994 A * 3/1994 Del Campo Aguilera ............... B64C 27/22 244/12.1
6,398,157 B1 * 6/2002 Ingram ..................... B64C 3/40 244/46

(Continued)

FOREIGN PATENT DOCUMENTS

DE    102009033821 A1    1/2011
EP         2435306 A2    4/2012
(Continued)

*Primary Examiner* — Assres H Woldemaryam
(74) *Attorney, Agent, or Firm* — Hayes Soloway PC

(57) ABSTRACT

An unmanned aerial vehicle (UAV) capable of vertical and horizontal flight modes, a method of assembling a UAV, and a kit of parts for assembling a UAV. The UAV comprises an elongated wing structure having an elongated axis along the longest dimension of the elongated wing structure, the elongated wing structure having a middle location at a substantially halfway point; a connecting structure extending substantially perpendicularly from the elongated wing structure, the connecting structure being offset from the middle location of the elongated wing structure at a first position along the elongated axis; and at least three sets of propellers, wherein at least two sets of propellers are mounted on the connecting structure, and wherein at least one set of propellers is mounted at a second position offset from the middle location in an opposite direction away from the connecting structure.

17 Claims, 7 Drawing Sheets

(51) Int. Cl.
    *B64C 27/08*    (2006.01)
    *B64C 27/10*    (2006.01)
    *A63H 27/00*    (2006.01)
    *B64C 39/02*    (2006.01)
    *B64C 11/48*    (2006.01)

(52) U.S. Cl.
    CPC ............ *B64C 27/10* (2013.01); *B64C 39/024* (2013.01); *B64C 2201/021* (2013.01); *B64C 2201/042* (2013.01); *B64C 2201/088* (2013.01); *B64C 2201/104* (2013.01); *B64C 2201/108* (2013.01); *B64C 2201/122* (2013.01); *B64C 2201/141* (2013.01)

(58) Field of Classification Search
    CPC ........ B64C 2201/104; B64C 2201/165; B64C 2201/028; B64C 2201/042; A63H 27/12
    See application file for complete search history.

(56) References Cited

U.S. PATENT DOCUMENTS

| | | | | |
|---|---|---|---|---|
| 7,874,513 | B1 * | 1/2011 | Smith | B64C 11/001 244/12.4 |
| 8,187,049 | B2 * | 5/2012 | Corsiglia | A63H 33/003 446/37 |
| 8,464,511 | B1 * | 6/2013 | Ribarov | B64C 11/48 60/226.1 |
| 8,505,846 | B1 * | 8/2013 | Sanders, II | B64C 29/02 244/7 A |
| 9,764,828 | B2 * | 9/2017 | Ulrich | B64C 27/16 |
| 2005/0178879 | A1 * | 8/2005 | Mao | B64C 29/02 244/7 B |
| 2006/0151666 | A1 | 7/2006 | VanderMey et al. | |
| 2010/0120321 | A1 * | 5/2010 | Rehkemper | A63H 27/12 446/36 |
| 2010/0123042 | A1 * | 5/2010 | Ballard | B64C 39/024 244/118.1 |
| 2011/0001020 | A1 * | 1/2011 | Forgac | B64C 29/0033 244/7 A |
| 2011/0042508 | A1 * | 2/2011 | Bevirt | B64C 15/00 244/12.4 |
| 2011/0150645 | A1 * | 6/2011 | Moore | B64C 11/003 416/1 |
| 2012/0056041 | A1 * | 3/2012 | Rhee | B64C 25/32 244/4 R |
| 2013/0020429 | A1 | 1/2013 | Kroo | |
| 2014/0217229 | A1 * | 8/2014 | Chan | B64C 29/02 244/6 |

FOREIGN PATENT DOCUMENTS

| | | |
|---|---|---|
| FR | 2903380 A1 | 1/2008 |
| WO | 2013048339 A1 | 4/2013 |
| WO | 2013178776 A1 | 12/2013 |

* cited by examiner

UNMANNED AERIAL VEHICLE

FIELD OF INVENTION

The present invention relates broadly to an unmanned aerial vehicle (UAV) capable of vertical and horizontal flight modes, a method of assembling a UAV, and a kit of parts for assembling a UAV.

BACKGROUND

An important capability enhancement of Vertical Take-Off and Landing (VTOL) aircraft is the ability to transition from vertical flight to horizontal flight during take-off, and vice versa during landing. There have been many designs that attempt to achieve such capability. For example, the tail-sitter design, such as model no. XFV-1 of the 1950s, using the same set of flight controls for both vertical and horizontal flight, represents one of the most direct ways of achieving transition flight. However, with the pilot facing upwards during vertical flight, making visual assessments, e.g. during landing, can be difficult.

Also, tail-sitter aircraft have other technical issues. For example, they tend to be susceptible to toppling, e.g. when landing under windy conditions. This is due to a high centre of gravity, relative to the size of the tail base. Addressing this issue may involve installing landing gears of a wide span or enlarging the span of the tail base to cover a wider area on the ground. However, these measures usually add weight and aerodynamic drag, which in turn may compromise the performance (e.g. cruise endurance) of the aircraft.

One existing solution to the above problems comprises using configurations that remain horizontal during transition, e.g. tilt-wings and/or tilt-rotors. This may also render the aircraft suitable for carrying passengers. However, tilt-wings and tilt-rotors need separate sets of flight controls for helicopter-mode and airplane-mode flight, resulting in high complexity in their development and implementation.

Unmanned aircraft, also known as unmanned aerial vehicles (UAVs), on the other hand, do not carry passengers or pilots. Hence, passenger- and pilot-related limitations of tail-sitters are not applicable to the design of transition-capable VTOL UAVs.

However, there are other issues which may arise during the development of autonomous flight transition for an UAV. For example, a typical transition manoeuvre spans a wide range of airspeeds and angles-of-attack. The presence of variables which cover a wide range of values, when multiplied in combinations with the other variables, can potentially result in massive aerodynamic databases for adequate coverage of the transition envelope. This may require significant effort and cost to generate by means such as wind tunnel testing, computational fluid dynamics (CFD) etc., when developing autonomous transition. In addition, highly non-linear aerodynamic characteristics and changes in stability characteristics associated with higher angles-of-attack require complex, non-linear control strategies and algorithms to be developed, further adding to the complexity of development efforts.

WO2013/048339 discloses a quad-rotor UAV capable of vertical and horizontal flight modes. However, in the event that one of the propellers fails, a loss of controllability of the UAV may occur.

A need therefore exists to provide a UAV that seeks to address at least some of the above problems.

SUMMARY

According to a first aspect, there is provided an unmanned aerial vehicle (UAV) capable of vertical and horizontal flight modes, comprising an elongated wing structure having an elongated axis along the longest dimension of the elongated wing structure, the elongated wing structure having a middle location at a substantially halfway point; a connecting structure extending substantially perpendicularly from the elongated wing structure, the connecting structure being offset from the middle location of the elongated wing structure at a first position along the elongated axis; and at least three sets of propellers, wherein at least two sets of propellers are mounted on the connecting structure, and wherein at least one set of propellers is mounted at a second position offset from the middle location in an opposite direction away from the connecting structure.

At least one of the at least three sets of propellers may comprise two propellers arranged in a co-axial and contra-rotating configuration.

The two sets of propellers may be mounted on the connecting structure. The two sets of propellers may be separated by the elongated wing structure. When the UAV comprises three sets of propellers, the remaining set of propellers may be mounted at the second position, the second position being a position on the elongated axis.

Each propeller may be independently drivable.

Each propeller may be independently controllable.

The UAV may further comprise a flight control module for controlling the at least three sets of propellers, the flight control module using the same set of controls for both vertical and horizontal flight modes.

The flight control module may be configured to control the at least three sets of propellers for autonomous transition of the UAV between vertical and horizontal flight modes, and vice versa, based on a predetermined range of angles-of-attack. The predetermined range of angles-of-attack may be within a linear aerodynamic regime.

The flight control module may be configured to control the at least three sets of propellers for autonomous compensation to maintain flight when at least one propeller of the at least three sets of propellers malfunctions.

The UAV may further comprise a fuselage disposed at the middle location on the elongated axis of the elongated wing structure.

At least portions of respective trailing edges of the elongated wing structure and the connecting structure may be disposed on the same plane for contacting a ground in a sitting position.

The same flight controls may be used for both vertical and horizontal flight modes.

The flight controls for roll, pitch and yaw in vertical and horizontal flight modes may be decoupled.

The UAV may be configured for vertical take off and landing independent of a runway or other launch and recovery equipment.

According to a second aspect, there is provided a method for assembling an unmanned aerial vehicle (UAV) capable of vertical and horizontal flight modes, the method comprising the steps of: providing an elongated wing structure having an elongated axis along the longest dimension of the elongated wing structure, the elongated wing structure having a middle location substantially halfway along the elongated axis; attaching a connecting structure to the elongated wing structure at a first position along the elongated axis offset from the middle location such that the connecting structure extends substantially perpendicularly from the elongated wing; mounting at least two sets of propellers on the connecting structure; and mounting at least one set of propellers at a second position offset from the middle location in the opposite direction away from the connecting structure.

The step of mounting at least one set of propellers may comprise arranging two propellers in a co-axial and contra-rotating configuration.

The method may further comprise the step of attaching a fuselage in the middle location on the elongated axis of the elongated wing structure.

According to a third aspect, there is provided a kit for assembling an unmanned aerial vehicle (UAV) capable of vertical and horizontal flight modes, the kit comprising an elongated wing structure having an elongated axis along the longest dimension of the elongated wing structure, the elongated wing structure having a middle location at a substantially halfway point; a connecting structure adapted to be attached to the wing structure at a first position along the elongated axis offset from the middle location of the elongated wing structure such that the connecting structure extends substantially perpendicularly from the elongated wing; and at least three sets of propellers, wherein at least two sets of propellers are adapted to be mounted on the connecting structure, and wherein at least one set of propellers is adapted to be mounted at a second position offset from the middle location in the opposite direction away from the connecting structure.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1:
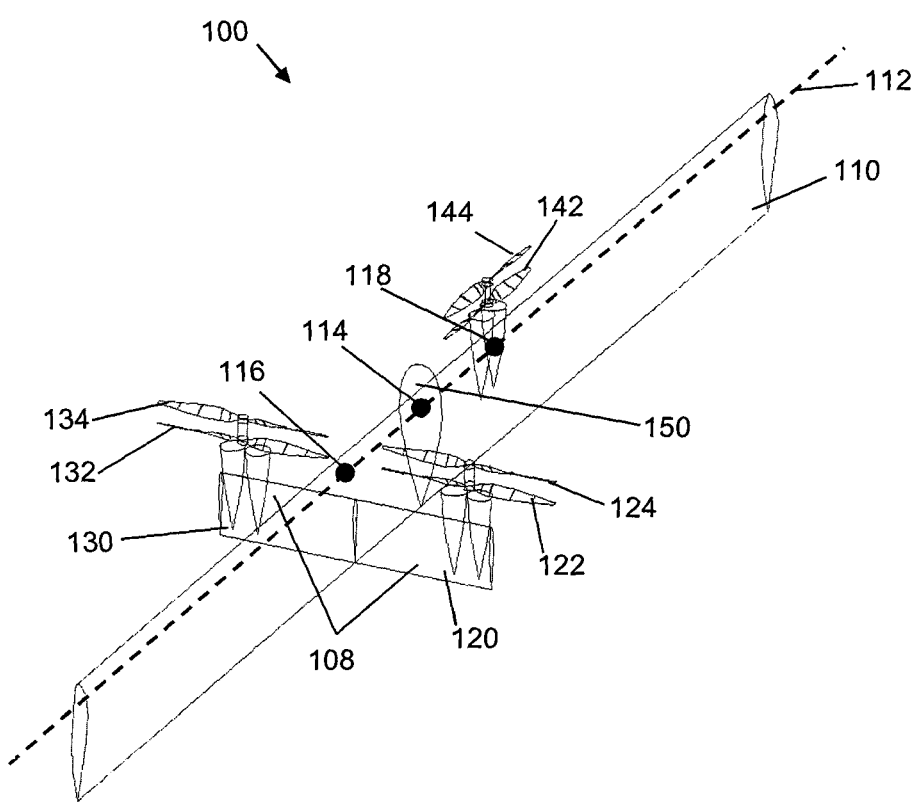
FIG. 1 shows a UAV according to an example embodiment in a Vertical Take-Off and Landing orientation.
Figure 2:
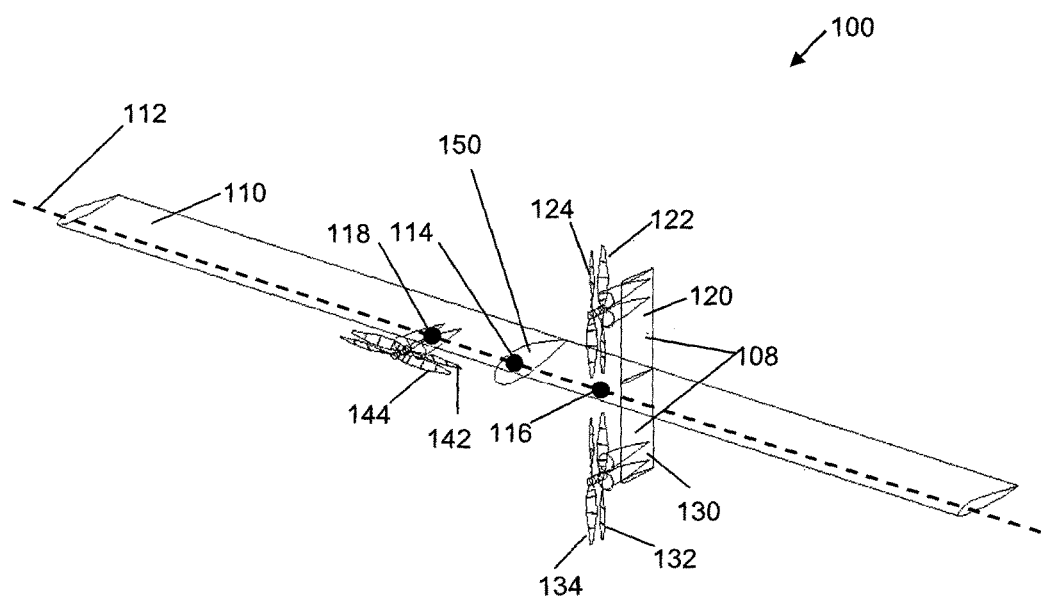
FIG. 2 shows the UAV of FIG. 1 in an airplane-mode orientation.

FIG. 1 shows a UAV 100 according to an example embodiment in a Vertical Take-Off and Landing orientation. FIG. 2 shows the UAV of FIG. 1 in an airplane-mode orientation. The UAV 100 includes an elongated wing structure 110 configured to provide lift when the UAV 100 is in a horizontal flight (i.e. airplane-mode). For example, the elongated wing structure 110 may comprise an airfoil structure, as will be appreciated by a person skilled in the art. In addition, the wing structure 110 in an example embodiment is a high aspect ratio (i.e. ratio of span over chord in the case of rectangular wing platforms) monoplane wing for high cruise efficiency. In one preferred implementation, the cross-section of the wing structure 110 is uniform from one wing tip to the other wing tip (i.e. rectangular wing), for simplifying fabrication and assembly. Additionally, such implementation allows the UAV 100 to sit on a trailing edge of the wing structure 110. The wing structure 110 is preferably fabricated from a light weight and durable material, e.g. a composite.

As can be seen from FIGS. 1 and 2, the elongated wing structure 110 has an elongated axis 112 along the longest dimension of the elongated wing structure 110. A middle location 114 is substantially halfway along the elongated wing structure 110.

The UAV 100 further includes a connecting structure 108 extending substantially perpendicularly from the elongated wing structure 110 at a first position 116 along the elongated axis 112. The first position 116 is offset from the middle location 114 of the elongated wing structure 110. The elongated wing structure 110 is shown to separate the connecting structure 108 into a first portion 120 and a second portion 130. In an embodiment, the connecting structure 108 may comprise a single continuous structure and may be assembled to the elongated wing structure 110 at its midpoint. In another embodiment, the connecting structure 108 may comprise a separate first portion 120 and second portion 130 assembled to the elongated wing structure 110.

As shown in FIG. 1 and FIG. 2, the first portion 120 of the connecting structure 108 extends substantially perpendicularly from the elongated wing structure 110 and the second portion 130 of the connecting structure 108 extends substantially perpendicularly from the elongated wing structure 110 in a direction opposite from which the first portion 120 extends. The first portion 120 and the second portion 130 may be pylons. The first portion 120 and the second portion 130, which may have a symmetric airfoil section typical of vertical fins, may have a span of adequate length to accommodate propellers 122, 124, 132, 134 without interference with any other structure of the UAV 100. At least portions of the trailing edge of the connecting structure 108 may be disposed on the same plane as at least portions of the trailing edge of the elongated wing structure 110, thus allowing the UAV 100 to be in a sitting position with these portions of the respective trailing edges contacting the ground. The first portion 120 and the second portion 130 of the connecting structure 108 may provide directional stability when the UAV 100 is in airplane mode flight. Similar to the wing structure 110, the connecting structure 108 may be preferably fabricated from a light weight and durable material such as a composite.

In FIG. 1 and FIG. 2, the UAV 100 is shown to be powered by three sets of propellers 122, 124, 132, 134, 142, 144 (which function as rotors during vertical flight). Two propellers 122, 124 are mounted on the first portion 120 of the connecting structure 108. Two propellers 132, 134 are mounted on the second portion 130 of the connecting structure 108. Two propellers 142, 144 are mounted on the elongated wing structure 110 at a second position 118. The second position is offset from the middle location 114 along the elongated axis in a direction opposite from which the connecting structure 108 is offset.

Figure 3:
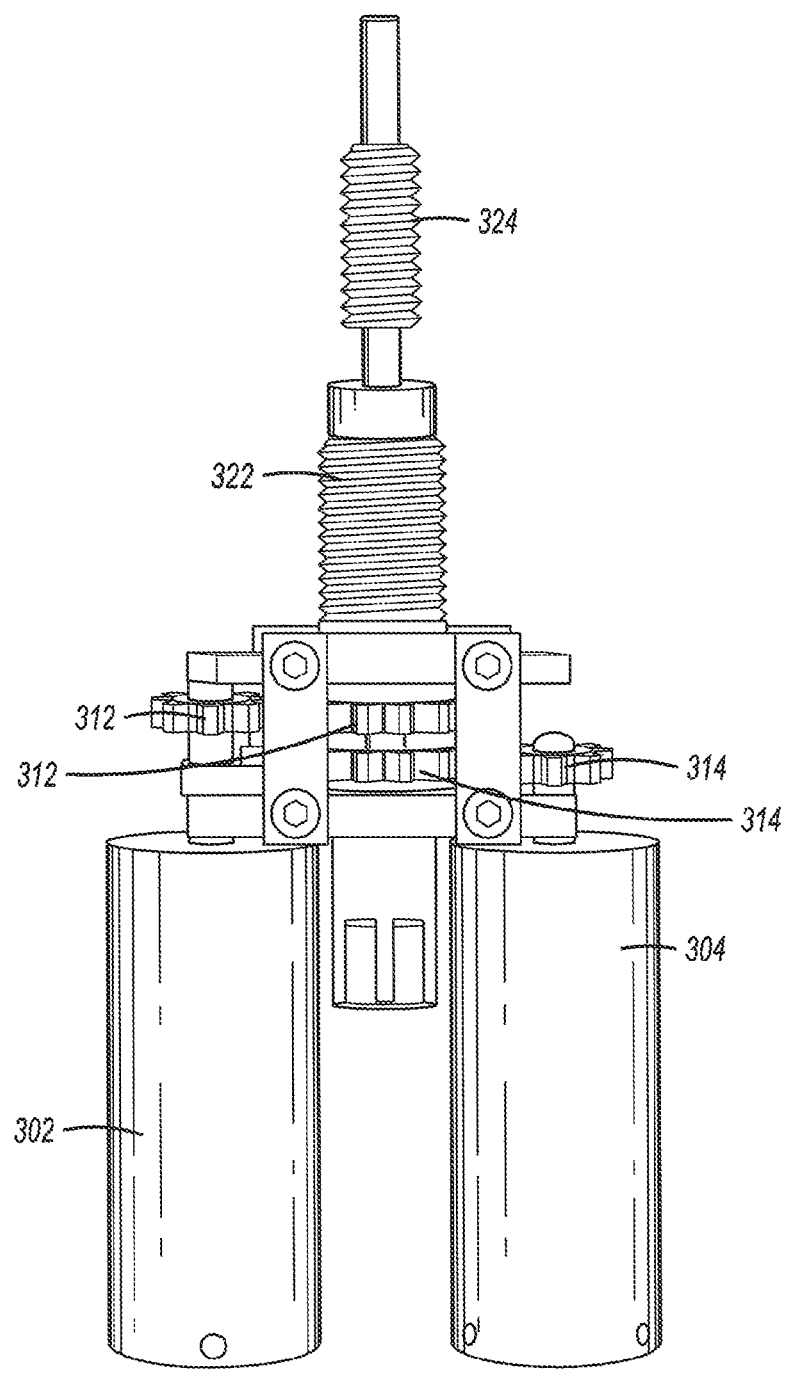
FIG. 3 illustrates an example of a co-axial and contra-rotating motor arrangement for the propellers.

Each set of propellers 122, 124 or 132, 134 or 142, 144 may be mounted such that the two propellers 122, 124 or 132, 134 or 142, 144 in each set may be co-axial and contra-rotating. For the two propellers 122, 124 or 132, 134 or 142, 144 in each set to be contra-rotating, each of the two propellers in each set is driven by its own motor. FIG. 3 is extracted from Bohorquez, F. et al, "Design, Analysis and Hover Performance of a Rotary Wing Micro Air Vehicle," *Journal of the American Helicopter Society*, April 2003, which illustrates an example of a configuration of a motor arrangement to achieve independently-controlled co-axial and contra-rotating characteristics. A first propeller 124, 134, 144 may be attached to an inner shaft 324. A second propeller 122, 132, 142 may be attached to an outer shaft 322. The inner shaft 324 and the outer shaft 322 are co-axially arranged such that the outer shaft 322 surrounds the inner shaft 324 longitudinally and are independently rotatable with respect to each'other. The inner shaft 324 is connected to a first motor 304 via a first gear reduction transmission 314. The outer shaft 322 is connected to a second motor 302 via a second gear reduction transmission 312. In this arrangement, the first motor 304 and the second motor 302 are able to drive the inner shaft 324 and outer shaft 322 independently. By rotating the inner shaft 324 and the outer shaft 322 in opposite direction, the first propeller 124, 134, 144 and the second propeller 122, 132, 142 may be rotated in opposite direction such that they are contra-rotating.

The propellers 122, 124, 132, 134, 142, 144 may have the same dimensions. The first set of propellers 122, 124 on the first portion 120 and the second set of propellers 132, 134 on the second portion 130 may be mounted such that the distance measured from the rotating axis of the first set of propellers 122, 124 to the elongated axis 112 is equal to the distance measured from the rotating axis of the second set of propellers 132, 134 to the elongated axis 112. The distances may be such that the propellers 122, 124, 132, 134 do not interfere with each other or with any other structure of the UAV 100.

It is understood that the number of propellers 122, 124, 132, 134, 142, 144 in each set of propellers may vary. For example, in an embodiment, each set of propellers may include only one propeller 122, 132, 142. It is also possible that, in another embodiment, each set of propellers may include a different number of propellers from the other sets. For example, the first set may include only one propeller 122 and the second set may include two propellers 132, 134, etc.

In yet another embodiment, there may be more than three sets of propellers. For example, the UAV 100 may include four sets of propellers. In this embodiment, the UAV 100 may include two connecting structures 108. The two connecting structures 108 may be offset from the middle location 114 of the elongated wing structure 110 such that there is one connecting structure 108 on each side of the middle location 114. Each connecting structure 108 may extend substantially perpendicularly from the elongated wing structure 110. Two sets of propellers may be mounted on each connecting structure 108.

In the embodiment in which each set of propellers include only one propeller, advantageously it is capable of vertical and horizontal flight with fewer components, thus causing a reduction in weight which can result in an improvement in power consumption and efficiency during flight in comparison with a quad-rotor UAV. However, this embodiment may also experience loss of controllability when any one of the propellers fails.

In the embodiment in which each set of propellers include two propellers, the problem of loss of controllability when one of the propellers fails may be overcome. Advantageously, in the configuration as shown in FIG. 1 and FIG. 2, by providing the UAV 100 with three sets of propellers 122, 124, 132, 134, 142, 144, each set having two co-axial and contra-rotating propellers, failure of one of the propeller will not lead to a total loss of controllability of the UAV 100. This is because, when any one of the propellers malfunctions, the remaining propellers may be controlled to compensate the loss in thrust such that the UAV 100 remains controllable for continued flight. Therefore, this configuration allows the UAV 100 to be capable of vertical and horizontal flight with the least number of propellers while preventing loss of controllability of the UAV 100 when any one of the propellers fails.

In FIG. 1 and FIG. 2, propellers 142, 144 are disposed at the leading edge of the elongated wing structure 110, while propellers 122, 124, 132, 134 are disposed at the leading edge of the connecting structure 108. It is understood that the propellers 122, 124, 132, 134 may be disposed at any of the respective trailing edges in a pusher arrangement. In this embodiment, the drag on the aircraft may be lower as the slipstream makes no contact with the aircraft structure, but it may then be more difficult to design the aircraft to sit on a ground with portions of the trailing edges of elongated wing structure 110 and connecting structure 108 contacting the ground.

As shown in FIG. 1 and FIG. 2, the UAV 100 also includes a fuselage 150 disposed at the middle location 114 on the elongated axis 112 of the elongated wing structure 110. The cross-section of the elongated wing structure 110 may be wider at a section adjacent the fuselage 150, and progressively tapers toward the wing tip, for improving aerodynamic efficiency. The fuselage 150 is shown to divide the elongated wing structure 110 into a left wing and a right wing. In an embodiment, the elongated wing structure 110 may comprise a single continuous structure and the fuselage may be assembled to its mid-point. In another embodiment, the elongated wing structure 110 may comprise a separate left and right wings assembled to the fuselage 150. Typically, the fuselage 150 may comprise a rigid housing that contains e.g. electronic components for controlling the UAV 100, power source, surveillance equipment, communication equipment, etc. The rigid housing may protect such components and devices against damage in case of impact.

Figure 4:
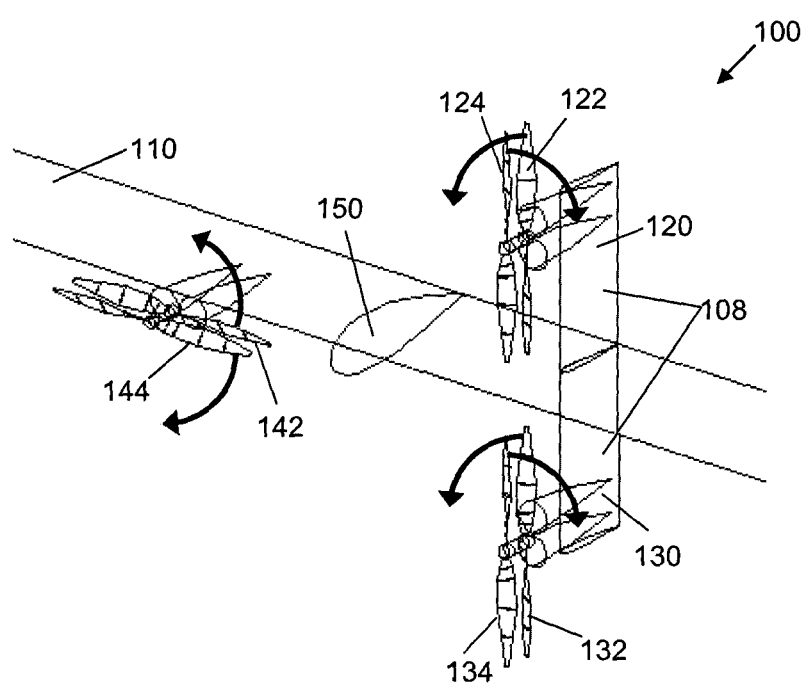
FIG. 4 illustrates the directions of the propellers 122, 124, 132, 134, 142, 144 rotations for UAV of FIG. 1.

FIG. 4 illustrates the directions of the propellers 122, 124, 132, 134, 142, 144 rotations. Here, UAV 100 is in a horizontal orientation and the propellers 122, 124, 132, 134, 142, 144 are being seen from the front. The rotational speeds of propellers 122, 124, 132, 134, 142, 144 may be individually and independently controlled in the embodiment. As shown, the two propellers 122, 124 or 132, 134 or 142, 144 in each set of propellers are contra-rotating, i.e. the outer propeller 124, 134, 144 and the inner propeller 122, 132, 142 rotate in opposite direction from each other. The corresponding propellers 122, 132, 142 or 124, 134, 144 between different sets rotate in the same direction. The '+' configuration of the propellers 122, 124 or 132, 134 or 142, 144, when seen from the front, enable the usual hex-rotor controls in the helicopter mode (vertical) to be directly translated into the usual roll, pitch and yaw controls in the airplane mode (horizontal).

In the embodiment as shown in FIG. 4, the flight control principle for the UAV 100 in the airplane mode flight can be established such that pitch is controlled by the differential thrust between the first set of propellers 122, 124 on the first portion 120 of the connecting structure 108 and the second set of propellers 132, 134 on the second portion 130 of the connecting structure 108; yaw is controlled by the differential thrust between propellers 122, 124, 132, 134 on the connecting structure 108 and the third set of propellers 142, 144; and roll is controlled by the differential thrust between the first propellers 124, 134, 144 in all three sets of propellers, i.e. the front propellers, and the second propellers 122, 132, 142 in all three sets of propellers, i.e. the rear propellers. In other words, pitch, yaw and roll controls are decoupled, and only one set of flight control effectors is used in this embodiment for both vertical and horizontal flight modes. No additional control surfaces or tilting mechanisms are also required. Advantageously, if any one of the propellers fails, the three sets of propellers may be controlled to compensate the loss of any of one of the propellers in order to maintain flight. The UAV 100 may include a flight control module for autonomous control of the flight using the above principle and/or provide autonomous compensation when any one of the propellers fails.

Figure 5:
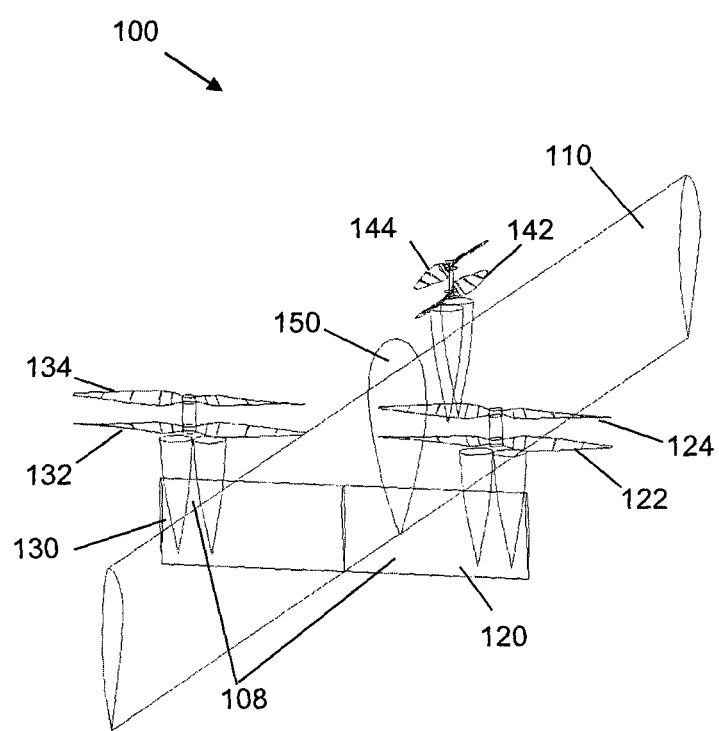
FIG. 5 shows the UAV of FIG. 1 in an orientation sitting on a ground, e.g. before take-off or after landing.

FIG. 5 shows the UAV 100 of FIG. 1 in an orientation sitting on a ground, e.g. before take-off or after landing. In this orientation, the tip of the fuselage 150 is pointing vertically upward. As can be seen from FIG. 5, the base of the UAV 100 is wide relative to its resting height, resulting in a substantially low centre of gravity in the embodiments. For example, the fuselage 150 is almost completely integrated into the elongated wing structure 110, and does not extend significantly above the elongated wing structure 110. The UAV 100 does not use a tail boom, thus reducing the resting height. Further, in the resting position, the pylons for propellers 122, 124, 132, 134 (utilising the connecting structure 108) are positioned on the ground, thus providing support to the UAV 100 on the ground, and resulting in no need for additional weight or landing gears. The low centre of gravity can improve the UAV 100's robustness to toppling in situations such as ground handling, landing in a wind, or rolling ship decks.

From the resting position as shown in FIG. 5, the UAV 100 may be vertically launched, without requiring a runway or launch equipment. During launch (and also during landing), the propellers 122, 124, 132, 134, 142, 144 (FIG. 1) function as rotors to provide lift to the UAV 100 (FIG. 1). The UAV 100 thus can lift off from the ground in the same manner as a helicopter. It will be appreciated that the propeller speeds may be adjusted to maintain a vertical flight direction during take off. Once a predetermined height, e.g. a safety clearance, and speed, e.g. stall speed or above, is achieved, the UAV 100 starts the transition into a horizontal flight, during which it usually conducts its main functions, e.g. surveillance, communication relaying, etc.

Figure 6:
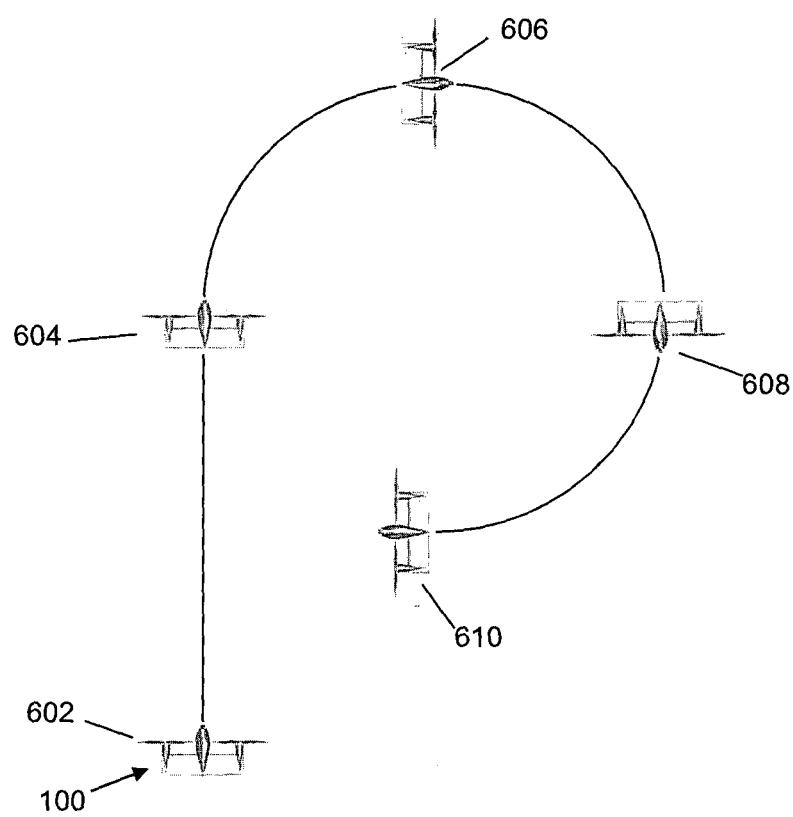
FIG. 6 shows a schematic diagram illustrating a typical transition manoeuvre by the UAV 100 of FIG. 1 according to an example embodiment.

FIG. 6 shows a schematic diagram illustrating a typical transition manoeuvre by the UAV 100 of FIG. 1 according to an example embodiment. As described above, transition from a vertical flight (helicopter mode) to a horizontal flight (airplane mode) uses a vertical climb, followed by a circular manoeuvre. At the first stage 602, the UAV 100 performs a vertical take-off. At the second stage 604, the UAV 100 reaches the predetermined height and speed, and starts to perform the circular manoeuvre. At the third stage 606, the UAV 100 reaches the maximum point of the circular manoeuvre, where it momentarily performs an inverted flight. At the fourth stage 608, the UAV 100 is momentarily downwardly oriented. At the fifth stage 610, the UAV 100 completes the transition manoeuvre and starts flying in the airplane mode.

For landing, it will be appreciated that the UAV 100 starts from the airplane mode. The UAV 100 may descend to a predetermined height, where it transitions toward the helicopter mode, e.g. by performing a pull-up manoeuvre that covers the quarter of the circular manoeuvre between the fifth stage 610 and the second stage 604 (FIG. 6), thereby briefly increasing its flying height. Once the UAV 100 is in a vertical orientation, its height (z-coordinate) is controllably decreased and its ground position (x-, y-coordinates) is controllably adjusted, e.g. by controlling the speeds of the respective propellers 122, 124, 132, 134, 142, 144 (FIG. 1), such that the UAV 100 can descend and land on a designated position on the ground, without requiring a runway or landing equipment.

In an embodiment, the UAV 100 is capable of executing the circular manoeuvre (for flight transition) that involves only linear aerodynamics. That is, throughout the transition manoeuvre, the angles-of-attack of the UAV 100 are within the linear, pre-stall range. This may be achieved, for example, by adequately powering and controlling the speed of the UAV 100, hence the radius of the circular motion. For example, the speed is at least the stall speed, with higher speeds utilising more power and requiring a more powerful engine.

Typically, the circular manoeuvre needs a significant power margin to accomplish as certain portions involve a vertical climb at speeds equal to at least the stall speed. As the UAV 100 of the example embodiments has no tail boom, landing gear, control surfaces, or tilting mechanisms and associated actuators, the UAV 100 is inherently lightweight, a feature that can facilitate meeting the severe power margin requirements of the circular manoeuvre while operating in the linear regime of aerodynamics.

Thus, during the development of an aerodynamic model for autonomous transition, there is no need to deal with the characteristics of complex, non-linear aerodynamics at high angles-of-attack, nor the complex changes in stability characteristics. Furthermore, as the transition uses only a narrow range of angles-of-attack and flight speeds, the size of the aerodynamic database needed for adequate coverage of the transition envelope may be significantly reduced, along with the cost and effort needed to generate it. In the example embodiments, these can result in distinct reductions in the complexity of aerodynamic modelling for autonomous transition development.

In an embodiment, the UAV 100 may include a flight control module configured to control the at least three sets of propellers for autonomous transition of the UAV between vertical and horizontal flight modes, and vice versa, based on a predetermined range of angles-of-attack.

Referring to FIG. 6, the power requirements are typically most severe (i.e. highest) at the second stage 604, which involves a vertically climbing flight. In the example embodiments, the powerplant of the UAV, e.g. utilising fuel cells, is configured to provide adequate power to move the UAV through this stage. Maximum power requirement may depend on factors such as total weight of the UAV, maximum speed, acceleration, etc. In some embodiments, a hybrid fuel cell system may be used for the powerplant, in case the power requirements exceed the power available from commercially available fuel cells. Such a hybrid fuel cell system typically comprises e.g. lithium-polymer batteries in addition to the fuel cells, for providing power for the more severe vertical and transition flight phases, following which the fuel cells can kick in for airplane mode cruise flight.

Figure 7:
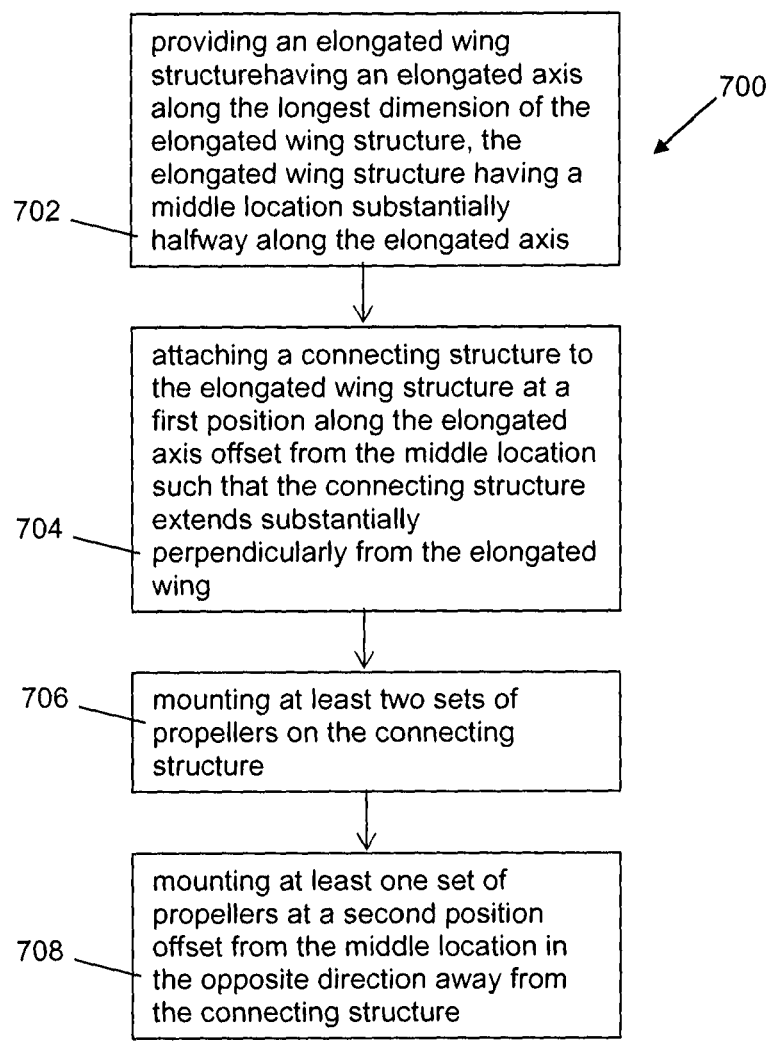
FIG. 7 shows a flow chart 700 illustrating a method of assembling a UAV capable of vertical and horizontal flight modes according to an example embodiment.

FIG. 7 shows a flow chart 700 illustrating a method of assembling a UAV capable of vertical and horizontal flight modes according to an example embodiment. At step 702, an elongated wing structure is provided. At step 704, a connecting structure comprising first and second portions is coupled to the elongated wing structure at a first position offset from the middle location on an elongated axis of the elongated wing structure. At step 706, at least two sets of propellers are mounted on the connecting structure. At step 708 at least one set of propellers is mounted at a second position offset from the middle location in the opposite direction away from the connecting structure.

The UAV according to the example embodiments advantageously is capable of vertical and horizontal flight with the least number of propellers while preventing loss of controllability of the UAV 100 when any one of the propellers fails. It does not require launch or recovery equipment, runway, or tilting mechanisms. Preferably, a single set of flight controls can be used, and the same controls concept can be applied in both vertical and horizontal flight modes. In addition, flight controls for roll, pitch and yaw are decoupled in vertical and horizontal flight modes. Thus, the UAV in the example embodiments may be less complex than tilt-rotor and tilt-wing equivalents. Moreover, the low centre of gravity may advantageously allow stable ground, handling, landing in a wind, or on rolling ship decks. This may also reduce the susceptibility to toppling found in tail-sitters. Further, the UAV according to the example embodiment is advantageously configured to accomplish flight transition using only the linear range of angles-of-attack. This may result in a distinct reduction in the cost, effort and complexity in the development of autonomous transition. The size (and cost to generate it) of the aerodynamic database for adequate coverage of the transition envelope may be reduced. This may also render unnecessary the characterization and analysis of the highly non-linear and complex aerodynamics which occur at the high angle-of-attack region, or the development of complex algorithms to achieve autonomous control over this region. Advantageously, the UAV of the example embodiments can make use of fuel cells (which have high energy densities or electrical charges per unit weight) for power during airplane mode cruise, for achieving high endurance. Meeting the severe power margin requirements of the transition manoeuvre may be facilitated by the UAV being inherently light in weight, as it has no tail boom, landing gear, control surfaces, or tilting mechanisms and associated actuators.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. An unmanned aerial vehicle (UAV) capable of vertical and horizontal flight modes, comprising:
   an elongated wing structure having an elongated axis along the longest dimension of the elongated wing structure, the elongated wing structure having a middle location at a halfway point;
   a connecting structure extending perpendicularly from the elongated wing structure at a first position along the elongated axis, the first position being offset from the middle location of the elongated wing structure; and
   three sets of propellers, each set of propellers having at least two propellers, wherein two sets of propellers are mounted on the connecting structure such that the two sets of propellers are separated by the elongated wing structure, and wherein one set of propellers is mounted at a second position along the elongated axis, the second position being offset from the middle location in an opposite direction away from the first position.

2. The UAV as claimed in claim 1, wherein the at least two propellers in each set of propellers are arranged in a co-axial and contra-rotating configuration.

3. The UAV as claimed in claim 1, wherein each propeller is independently drivable.

4. The UAV as claimed in claim 1, wherein each propeller is independently controllable.

5. The UAV as claimed in claim 1, further comprising a flight control module for controlling the three sets of propellers, the flight control module using the same set of controls for both vertical and horizontal flight modes.

6. The UAV as claimed in claim 5, wherein the flight control module is configured to control the three sets of propellers for autonomous transition of the UAV between vertical and horizontal flight modes, and vice versa, based on a predetermined range of angles-of-attack.

7. The UAV as claimed in claim 6, wherein the predetermined range of angles-of-attack are within a linear aerodynamic regime.

8. The UAV as claimed in claim 5, wherein the flight control module is configured to control the three sets of propellers for autonomous compensation to maintain flight when at least one propeller of the three sets of propellers malfunctions.

9. The UAV as claimed in claim 1, further comprising a fuselage disposed at the middle location on the elongated axis of the elongated wing structure.

10. The UAV as claimed in claim 1, wherein at least portions of respective trailing edges of the elongated wing structure and the connecting structure are disposed on the same plane for contacting a ground in a sitting position.

11. The UAV as claimed in claim 1, wherein the same flight controls are used for both vertical and horizontal flight modes.

12. The UAV as claimed in claim 11, wherein flight controls for roll, pitch and yaw in vertical and horizontal flight modes are decoupled.

13. The UAV as claimed in claim 1, configured for vertical take off and landing independent of a runway or other launch and recovery equipment.

14. A method for assembling an unmanned aerial vehicle (UAV) capable of vertical and horizontal flight modes, the method comprising the steps of:
   providing an elongated wing structure having an elongated axis along the longest dimension of the elongated wing structure, the elongated wing structure having a middle location halfway along the elongated axis;
   attaching a connecting structure to the elongated wing structure at a first position along the elongated axis offset from the middle location such that the connecting structure extends perpendicularly from the elongated wing;
   mounting two sets of propellers on the connecting structure such that the two sets of propellers are separated by the elongated wing structure; and
   mounting one set of propellers at a second position along the elongated axis offset from the middle location in an opposite direction away from first position,
   wherein each set of propellers have at least two propellers.

15. The method as claimed in claim 14, wherein mounting each set of propellers comprises arranging the at least two propellers in a co-axial and contra-rotating configuration.

16. The method as claimed in claim 14, further comprising the step of attaching a fuselage in the middle location on the elongated axis of the elongated wing structure.

17. A kit for assembling an unmanned aerial vehicle (UAV) capable of vertical and horizontal flight modes, the kit comprising:
   an elongated wing structure having an elongated axis along the longest dimension of the elongated wing structure, the elongated wing structure having a middle location at a halfway point;

a connecting structure adapted to be attached to the wing structure at a first position along the elongated axis offset from the middle location of the elongated wing structure such that the connecting structure extends perpendicularly from the elongated wing; and three sets of propellers, each set of propellers having at least two propellers, wherein two sets of propellers are adapted to be mounted on the connecting structure such that the two sets of propellers are separated by the elongated wing structure, and wherein one set of propellers is adapted to be mounted at a second position along the elongated axis offset from the middle location in an opposite direction away from the first position.

* * * * *